(12) United States Patent
Reich et al.

(10) Patent No.: US 12,521,549 B2
(45) Date of Patent: Jan. 13, 2026

(54) NEUROIMPLANT WITH PROTECTIVE STRUCTURE

(71) Applicant: CorTec GmbH, Freiburg (DE)

(72) Inventors: Stefan Reich, Munich (DE); Maurits Ortmanns, Ulm (DE); Martin Schuettler, Emmendingen (DE)

(73) Assignee: CorTec GmbH, Freiburg (DE)

( * ) Notice: Subject to any disclaimer, the term of this patent is extended or adjusted under 35 U.S.C. 154(b) by 316 days.

(21) Appl. No.: 18/367,850

(22) Filed: Sep. 13, 2023

(65) Prior Publication Data

US 2024/0091526 A1  Mar. 21, 2024

(30) Foreign Application Priority Data

Sep. 15, 2022  (DE) ................. 10 2022 123 703.6

(51) Int. Cl.
*A61N 1/08* (2006.01)
*A61N 1/05* (2006.01)
*A61N 1/36* (2006.01)
*A61N 1/372* (2006.01)

(52) U.S. Cl.
CPC ............ *A61N 1/0529* (2013.01); *A61N 1/08* (2013.01)

(58) Field of Classification Search
CPC .... A61N 1/0529; A61N 1/08; A61N 1/36125; A61N 1/3605; A61N 1/36128; A61N 1/36135; A61N 1/36139; A61N 1/36146; A61N 1/36153; A61N 1/36157; A61N 1/37205; A61N 1/37252; A61B 5/6868; A61B 5/388; A61B 2562/0209; A61B 2562/18; A61B 5/263; A61B 5/291; A61B 5/30; A61B 5/377; A61B 5/686; A61B 5/7203; A61B 5/7217; A61B 5/7225
See application file for complete search history.

(56) References Cited

U.S. PATENT DOCUMENTS

| 11,260,235 B2 | 3/2022 | Varkuti | |
| 2013/0090712 A1* | 4/2013 | Popovic | A61N 1/0476 607/148 |
| 2021/0093872 A1* | 4/2021 | Várkuti | A61N 1/0529 |

FOREIGN PATENT DOCUMENTS

DE  10 2019 214 752 A1  4/2021

OTHER PUBLICATIONS

Examination Notice issued by the German Patent and Trademark Office for German Patent Application No. 10 2022 123 703.6, dated Jun. 1, 2023, with a machine generated English translation.

* cited by examiner

*Primary Examiner* — Carl H Layno
*Assistant Examiner* — Anh-Khoa N Dinh
(74) *Attorney, Agent, or Firm* — Myers Wolin, LLC

(57) ABSTRACT

A neural implant for a brain area is provided. The neural implant has at least one stimulation section for generating stimulation signals for the brain area, an electrode section with at least one electrode, which is coupled to the stimulation section via a DC connection and can be arranged in the brain area and is designed to apply the stimulation signals to the brain area, and at least one first protection structure section, which is designed to monitor the stimulation section. The first protection structure section is powered by a first energy supply and the protective structure section is powered by a second energy supply, and the first energy supply is galvanically isolated from the second energy supply.

15 Claims, 3 Drawing Sheets

NEUROIMPLANT WITH PROTECTIVE STRUCTURE

CROSS REFERENCE TO RELATED APPLICATIONS

This application claims priority to German Patent Application No. 10 2022 123 703.6, filed Sep. 15, 2022, the contents of which are incorporated by reference herein.

FIELD OF THE INVENTION

The present invention relates to a neural implant with protective structure. Neural implants are used in the brain of a human to treat diseases, e.g., Parkinson's and epilepsy.

BACKGROUND

Neural implants comprise sections for the electrical stimulation of neural regions of the brain and electrode sections for contacting these brain regions. Neuromodulators, specifically closed-loop neural implants, additionally comprise sections for detecting neuronal activity (i.e., electrical signals) from regions of the brain.

Stringent safety precautions are stipulated for human implantable neural implants, so that even after a so-called first fault, the implant does not pose a risk to the patient's health.

First faults are, for example, continuously strong currents which—due to a malfunction, in particular, of the stimulation sections—flow from the neural implant into the brain. In order to exclude such first faults, it is known to insert DC-blocking capacitors between the stimulation section and the electrode section. However, these are disadvantageous due to the geometric size of the SMD capacitors, which is problematic especially with multi-channel neural implants. In addition, magnetic materials in the capacitor components used lead to shadowing the MRI image in the vicinity of the implant, which may worsen or prevent diagnostic results. Specific non-magnetic MRI capacitors are not available with the required capacitance.

Due to the necessary large capacitance of typically approximately 10 g per capacitor, integration on the chip is thus excluded.

It is also known to provide the stimulation sections with fast changeover switches, so that a much smaller and thus chip-integrable block capacitance is sufficient. However, the price paid is a more complicated and more complex design of the stimulation sections, large space requirements of the integrated capacitors and significant limitations at the maximum generatable stimulation current strength.

SUMMARY

It is therefore an object of the present disclosure to provide a neural implant in which the aforementioned technical problems are at least partially alleviated.

This object is achieved by the neural implant according to the embodiments of this disclosure.

Accordingly, a neural implant for the brain region is provided, having:
at least one stimulation section for generating stimulation signals for the brain region,
an electrode section having at least one electrode which is coupled to the at least one stimulation section via a DC connection and can be arranged in the brain region and is designed to apply the stimulation signals to the brain region, and
at least one first protective structure section designed to monitor the at least one stimulation section,
wherein
the at least one first protective structure section is powered by a first energy supply and the at least one stimulation section is powered by a second energy supply, and
the first energy supply is galvanically isolated from the second energy supply.

The novel first protective structure allows for increased safety in the first-fault case without external or internal block capacitors being provided between the electrode section and the stimulation section. Because the at least one first protective structure section is powered by an independent supply voltage, said first protective structure section is operational even in the event of faults in the region of the neural implant chip.

In a further embodiment of the invention, the at least one stimulation section and at least one detection section, if present, and the at least one first protective structure section are formed on a common semiconductor substrate. This means that these sections are formed by a System on Chip (SoC) or ASIC. The only electrical independence of the at least one first protective structure section from the at least one stimulation section and from the at least one detection section, if present, enables a space-saving design of the neural implant on the common semiconductor substrate.

A self-test that can be repeated at any time using the at least one stimulation section serves to protect against faults on the protective structure.

The at least one first protective structure section itself does not consume a DC operating point current and is very efficient.

The at least one first protective structure section comprises a DC-DC converter which generates reference voltage levels from the supply voltage. The associated reference voltage level is generated accordingly by a charge pump. These threshold voltages serve to define a voltage window considered safe.

The at least one first protective structure section may be further designed to output a signal when at least one of the detected stimulation signals is outside of at least one predetermined voltage range.

For this purpose, a window threshold detector (window comparator) can be provided, for example, comprising two dynamic comparators (e.g., StrongARM latches) with a high-voltage (HV) stable input pair and minimal additional digital logic. Said window threshold detector is able to generate a status information flag which indicates whether the voltage at the electrode section is within or outside of the predetermined voltage window or voltage range, and can thus reliably detect a possible first-fault case.

The first energy supply may constitute a DC voltage source, and the at least one first protective structure section may comprise a first DC converter for generating first reference voltages from the first energy supply and a first comparison device for comparing the stimulation signals applied to the electrode device with the first reference voltages.

The DC converter may comprise a charge pump for generating reference voltages.

The at least one first protective structure section may comprise a window threshold detector for checking whether the detected stimulation signals at the electrode section are within a predetermined voltage range.

The window threshold detector may have a dynamic comparator, in particular a StrongARM latch.

In a further embodiment of the invention, the neural implant may have at least one second protective structure section, which has a second DC converter for generating second reference voltages from the second energy supply and a second comparison device for comparing the stimulation signals applied to the electrode device with the second reference voltages.

The advantages of this implementation are the circuit-independent realization of the main circuit, i.e., the stimulation section, operation without static DC operating point current (i.e., minimal power consumption), the ability of the system to self-test at any time using the programmable stimulator, the avoidance of the external block capacitors and the flexibility due to the user programmable voltage limits.

Galvanic coupling of the protective structure section and the stimulation section is required only at the "measuring point", i.e., at the electrode section, for measuring the voltage at the electrode device. In this way, the protective structure section can monitor the stimulation section and, moreover, can simultaneously be tested by an external unit using the stimulation section ("self-test"). Periodic self-tests, or monitoring of the status information/flags with each stimulation (accepted fault message, since events caused themselves) increase safety by continuously checking functionality.

Furthermore, it may be provided that the neural implant further has at least one detection section for detecting signals from the brain region, wherein the at least one detection section is coupled to the electrode section. The neural implant then constitutes a neuromodulator.

In all embodiments and variations, the neural implant may be divided into a number of channels, each channel of which comprises a stimulation section, a detection section, an electrode of the electrode section, and a protective structure section.

BRIEF DESCRIPTION OF THE DRAWING

The invention and exemplary embodiments are described in more detail with reference to the drawing. In the drawings.

DETAILED DESCRIPTION OF THE PREFERRED EMBODIMENTS

Figure 1:
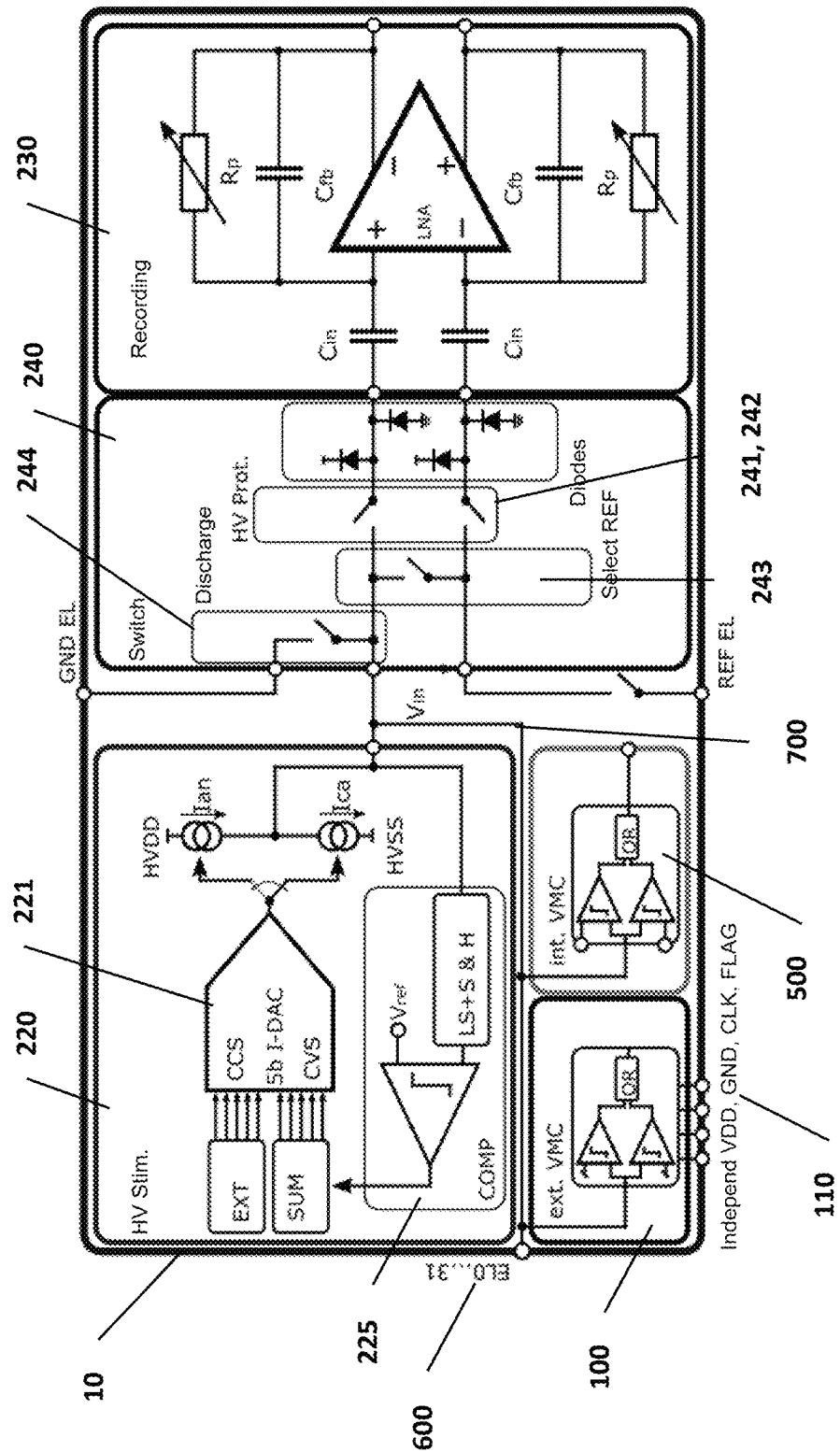
FIG. 1 shows an exemplary embodiment of the invention.

FIG. 1 illustrates an exemplary embodiment of the invention.

The neural implant has at least one stimulation section 220 for generating stimulation signals for the brain area and an electrode section 600 connected to the stimulation section 220 for contacting the brain area. The electrode section 600 having at least one electrode is coupled to the stimulation section 220 via a DC connection 700 for transmitting the stimulation signals. Direct current can flow (in principle continuously) between the electrodes of the electrode section 600 and the stimulation section 220 via the DC connection 700. This implies that there can be no capacitors, that are arranged in these connections 700 and could cause DC decoupling of the electrode and stimulation section 220.

Furthermore, the neural implant has at least one first protective structure section 100 for monitoring the at least one stimulation section 220 to prevent currents flowing continuously into the brain due to a malfunction of the stimulation section 220.

The at least one first protective structure section 100 is powered by a first energy supply 110, while the neuromodulation section 200 is powered by a second energy supply 210. The first energy supply 110 is galvanically isolated from the second energy supply 210. In this context, galvanically isolated means that the two energy supplies do not have common lines and also no common ground point.

The first energy supply 110 is therefore independent of the second energy supply 210.

The connection between the stimulation section 220 and the electrode section 600 has a DC connection 700, i.e., is designed without DC decoupling. Decoupling capacitors in this connection 700 are thus dispensed with.

The neural implant of a variant of the exemplary embodiment further comprises at least one detection section 230 for detecting signals from the brain region and is divided into a plurality of identically designed channels 10; a typical number is 32 channels. In FIG. 1, only one channel 10 is shown. This neural implant is therefore a neuromodulator or closed-loop neural implant.

The electrode section 600 comprises a number of electrodes. The number of electrodes is generally at least as large as the number of channels 10.

Each channel 10 is associated with or can be associated with exactly one electrode of the electrode section 600, a stimulation section 220, a detection section 230 (according to the variant) and a first protective structure section 100.

Each channel 10 (according to the variant) is bi-directionally, i.e., can conduct electrical signals and other electrical variables in two directions. In the one direction, stimulation signals generated by the at least one stimulation section 220 are conducted to the respective electrode, in the opposite direction neuronal signals are conducted from the brain region, which are detected via the electrode of the electrode section 600, to the at least one detection section 230.

The stimulation section 220 of each channel 10 comprises a Digital-to-Analog converter (DAC) 221 for generating analog stimulation signals from externally supplied digital control signals. The DAC 221 may be a 5-Bit current DAC with a high-voltage push-pull output stage. The high voltage is, for example, 18 V.

The stimulation section 220 may be configured in various modes. In a first mode, it generates current-controlled stimulation signals (CCS), in a second mode, it generates voltage-controlled stimulation signals (CVS). In the second mode, the DAC 221 and the high voltage output are embedded in a DSM-based feedback loop 225.

In the exemplary embodiment, the stimulation section 220 has an increased dynamic range by scaling the current balancing gain options. In the exemplary embodiment, the dynamic range is 66 dB, with stimulation currents of 5 μA to 10 mA.

The stimulation section 220 has flexible signal shape generation which is based on a state machine with sequential execution of stimulation commands. Said flexible signal shape generation is expanded by programmable loops within the command panel, enabling extended repeated implementations of waveforms and commands.

Each first protection structure section 100 comprises a voltage monitoring circuit (eVMC). Said eVMC is connected to the electrode of the channel 10. The voltage monitoring circuit is designed as a window comparator.

In a further variant (combinable with any other variant), a second protective structure section 500 is provided for each channel 10. This second protective structure section 500 also represents a voltage monitoring circuit (iVMC). The second protection structure section 500 is electrically independent of the first protective structure section 100. The second protective structure section is powered by the second energy supply 210, i.e., from the energy supply of the neuromodulator section.

Thus, two electrically independent instances of voltage monitoring circuits (eVMC, iVMC) or protective structure sections per channel 10 are provided here.

The entire neural implant can be controlled by a microcontroller unit (MCU, not illustrated).

Figure 2:
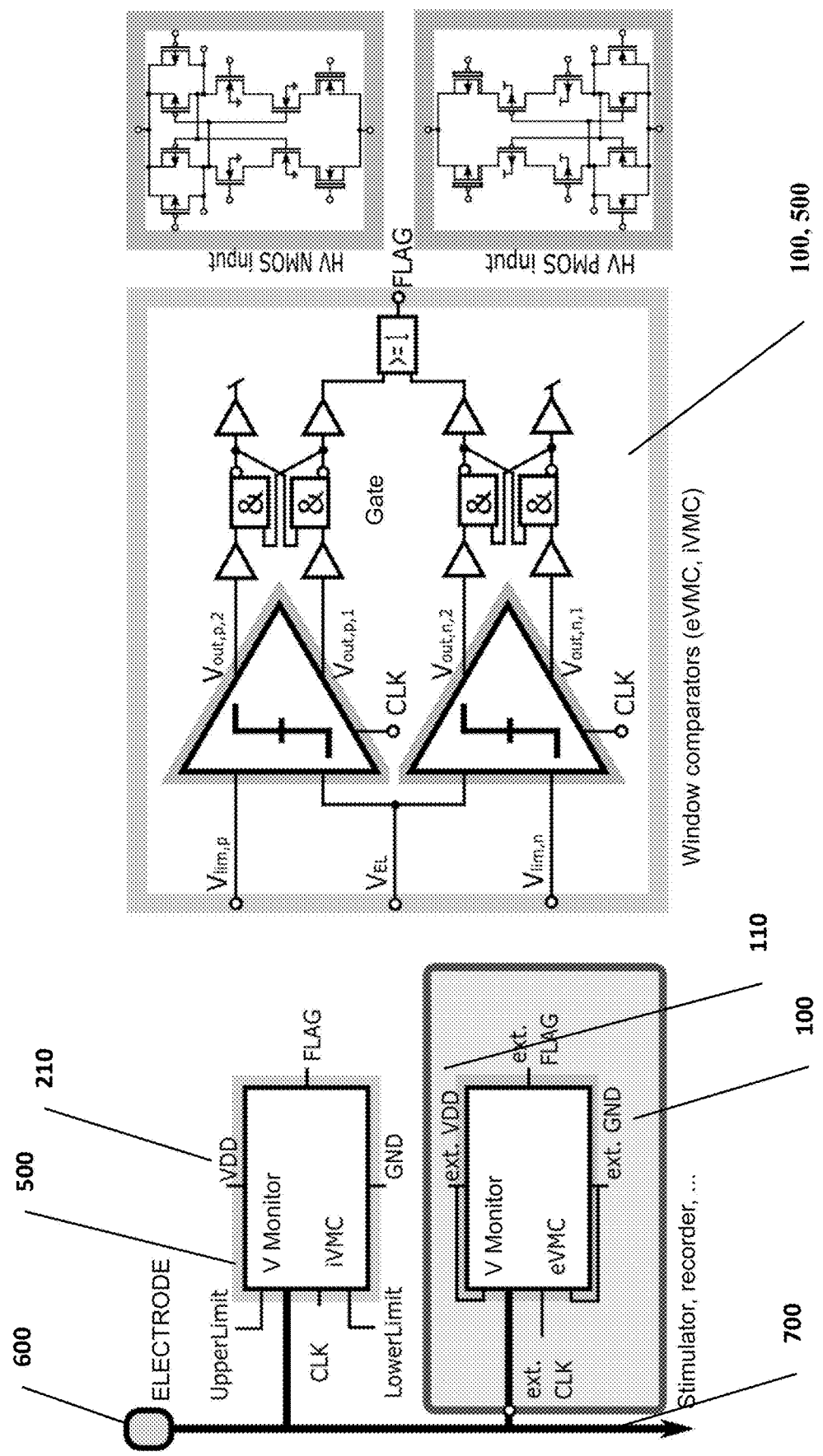
FIG. 2 shows a detail of the protective structure sections according to the exemplary embodiment of the invention.

FIG. 2 illustrates an exemplary technical design of the first protective structure section 100 and the second protective structure section 500. Here, the window comparators are each realized by means of particularly low-feedback-noise StrongARM latches. Said low-feedback-noise StrongARM latches have HV-MOS transistors as input elements so that they withstand the voltages of the stimulation signals at the electrodes. The comparator monitoring the upper limit value $V_{lim,p}$ is provided with an NMOS input element while the comparator, monitoring the lower limit value $V_{lim,n}$, is provided with an HV-PMOS input element.

The comparators of both protective structure sections 100, 500 are designed for PVT fluctuations of up to 30 mV (36).

Apart from this, the two protective structure sections (eVMC, iVMC) 100, 500 are designed differently from one another. As noted above, the first protective structure section (eVMC) 100 is powered by the first voltage supply 110, which is independent of the second voltage supply 210 of the second protective structure section (iVMC). The first voltage supply 110 is the external voltage supply with respect to the stimulation section 220. It is galvanically isolated from the second voltage supply 210, i.e., does not have a common line path with the second voltage supply 210.

The second protective structure section (iVMC) 500 may have digitally programmable voltage ranges or thresholds. These programmable voltage ranges are, for example, ±375 mV to ±750 mV or ±1.125 V to ±1.5 volts by the body potential point $V_{CM}$. One of these voltage ranges can be programmed at a time.

Each of the two protective structure sections 100, 500 triggers a signal, e.g., an interrupt flag, at a voltage value at an electrode that is outside the relevant voltage range, so that the MCU can react thereto and can query which electrode has triggered the warning.

Thus, there are two protective structure sections 100, 500 that independently of one another monitor the stimulation sections and the electrodes. External separation capacitors between the electrodes and the neuromodulation section 200 can thereby be avoided.

The second protective structure section 500 can be designed in such a way that it, in addition to the signal or interrupt flag, outputs information about at which electrode of the electrode section 600 the measured voltage is outside the predetermined window range.

The MCU can further be designed to find out whether the cause for the fault is a hardware defect such as, for example, a damaged or short-circuited line or whether it is a software defect such as an incorrectly calculated stimulation signal.

Depending on this, the MCU then control the stimulation section 220 to change the voltage of the stimulation signals (e.g., in the case of a software defect), or else deactivate the relevant stimulation section 220 (e.g., in the case of a hardware defect).

Furthermore, the second protective structure section 500 can be designed such that once the flag is set, it remains set until the fault is rectified (by the MCU).

The first protective structure section 100 can in principle be designed in the same way as the second protective structure section 500 with regard to the information output. However, where simplicity is a decisive factor, it can be provided that the first protective structure section 100 outputs only the interrupt flag without the information at which electrode of the electrode section 600 the fault has occurred.

Furthermore, again, for reasons of simplicity, the first protective structure section 100 can be designed in such a way that the signal or interrupt flag remains set only as long as an incorrect voltage is measured by the first protective structure section 100, and immediately disappears once an incorrect voltage is no longer measured.

Of course, monitoring specifically by the second protective structure section 500 functions reliably only as long as the stimulation section 220 and the detection section 230 implemented on the ASIC function as intended. Should these be faulty and should, as a result, the second monitoring device 500 also not function correctly, the first protective structure section 100 is still functional, which first protective structure is arranged physically coupled on the same substrate, but electrically isolated from it due to its own first power supply, which is independent of the power supply of the stimulation section and the detection section, i.e., galvanically isolated.

In a further exemplary embodiment, the neural implant has a self-test function for the at least one first and/or second protective structure section 100, 500. In this case, the respective stimulation section 220 is designed to generate defined voltage patterns and to apply them to the respective electrode. This may be controlled by the MCU. The MCU can then be used to check whether the protective structure section 100, 500 outputs a respective interrupt flag and which, if appropriate, outputs the information at which electrode the voltage has occurred and which voltage threshold has been exceeded.

Figure 3:
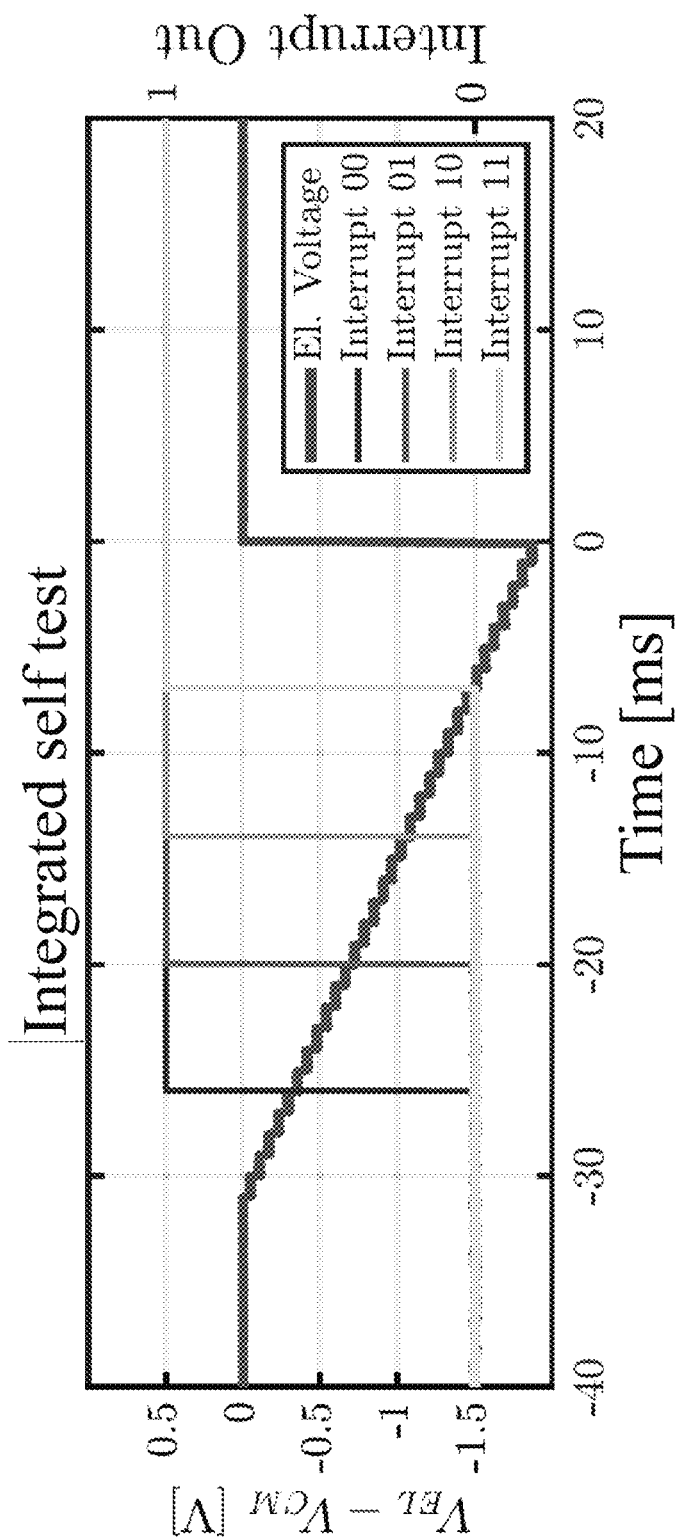
FIG. 3 shows a voltage-time diagram of a self-test with the protective structure sections according to the exemplary embodiment of the invention.

FIG. 3 is a diagram of such a self-test for a protective structure section 100, 500. The first and/or the protective structure section 100, 500 are designed here to detect the exceeding of one of four different voltage thresholds and to set the information (one of 00, 01, 10, 11 for the detected voltage threshold) in accordance with the detected exceeded voltage threshold to the signal or interrupt flag. Here, the voltage at an electrode $V_{EL}$, based on the body potential $V_{CM}$, starting with the body potential $V_{CM}$, is continually changed. It is then checked whether the signal or interrupt flag and the corresponding information 00, 01, 10, 11 are set when the respective voltage threshold is reached. Two bits are sufficient for four different information, 00, 01, 10, 11. The self-test can be controlled by the MCU. The self-test can be repeated at any time.

The neural implant further comprises a switch matrix section 240 arranged between the electrode section 600 and the at least one detection section 230. The switch matrix section 240 comprises switching devices 241, 242 for each channel 10 for coupling the electrode of each channel 10 to the detection section 230 of the channel 10 or decoupling it therefrom. In addition, the switch matrix section 240 comprises switching devices 243 with which each electrode can be connected to ground GND. In this way, the relevant electrode can be discharged, for example.

Furthermore, the switch matrix section 240 comprises switching devices 244 with which an electrode (or multiple electrodes) can be connected as reference electrode REF. If the electrode is connected as reference electrode REF, it can be coupled to the reference input, for example the inverting input (—) of each detection section 230, while it can be decoupled from the measurement input, for example the non-inverting input (+) of the relevant detection section 230. In this way, the potential REF of the reference electrode can be applied to each detection section 230 as the common reference potential.

This feature is frequently requested in practical applications because the characteristic of implanted electrodes prior to implantation is unknown and, moreover, can vary over time, which makes it disadvantageous to define a specific electrode as reference electrode a priori.

Thus, the switch matrix section 240 is adaptable in such a way that the reference electrode REF is not simultaneously used as a charge sink for the passive discharge of electrodes after the stimulation, because this can lead to artefacts and charging of the reference electrode REF. Instead, an electrode different from the reference electrode is used as ground electrode GND for discharging. This also provides a better reference when detecting and recording the neuronal signals.

Each channel 10 is digitally controlled by a state machine which is programmable by means of SPI communication (SPI=Serial Peripheral Interface).

Furthermore, the at least one detection section 230 is programmable, whereby it is made possible to record either local field potential (LPFs), action potential (APs) or both bands with selectable optional amplification and bandwidth settings.

At least one Analog-to-Digital converter (ADC) is provided for digitizing the detected neuronal signals and for generating a data stream via SPI therefrom. In an exemplary embodiment, two 16-Bit ADCs are provided, i.e., each ADC can be coupled to 16 channels. Each ADC can be connected periodically in time-division multiplexing with the individual channels to digitize the signals detected via them.

What is claimed is:

1. A neural implant for the brain region, comprising:
   at least one stimulation section for generating electrical stimulation signals for the brain region,
   an electrode section having at least one electrode, which is coupled to the at least one stimulation section via a DC connection and can be arranged in the brain region and is designed to apply the electrical stimulation signals to the brain region, and
   at least one first protective structure section designed for monitoring the stimulation section,
   wherein the at least one first protective structure section is powered by a first energy supply and the at least one stimulation section is powered by a second energy supply, and
   the first energy supply is galvanically isolated from the second energy supply.

2. The neural implant of claim 1, wherein the at least one first protective structure section and the at least one stimulation section are arranged on a common semiconductor substrate and, in particular, are designed as an ASIC chip.

3. The neural implant of claim 1, wherein the at least one first protective structure section and the at least one stimulation section are galvanically interconnected only via the electrode section and the at least one first protective structure section is designed to detect the stimulation signals at the electrode section.

4. The neural implant of claim 3, wherein the at least one first protective structure section is further designed to output a signal when at least one of the detected stimulation signals is outside a predetermined voltage range.

5. The neural implant of claim 1, wherein the first energy supply represents a DC voltage source and the first protective structure section comprises a first DC converter for generating a first reference voltage from the first energy supply and a first window comparator for comparing the stimulation signals applied to the electrode device with the first reference voltage.

6. The neural implant of claim 5, wherein the DC converter comprises a charge pump for generating reference voltages.

7. The neural implant of claim 6, wherein the at least one first protective structure section comprises a window threshold detector for checking whether the detected stimulation signals at the electrode section are outside a predetermined voltage range.

8. The neural implant of claim 7, wherein the window threshold detector has a dynamic comparator, in particular, a StrongARM latch.

9. The neural implant of claim 1, further comprising at least a second protective structure section comprising a second DC converter for generating second reference voltages from the second energy supply and a second window comparator for comparing the stimulation signals applied to the electrode device with the second reference voltages.

10. The neural implant of claim 1, further comprising at least one detection section for detecting signals from the brain region, wherein the at least one detection section is coupled to the electrode section.

11. The neural implant of claim 1, wherein the neural implant is divided into a number of channels, each channel comprising a simulation section, a detection section, an electrode of the electrode section and an protective structure section.

12. The neural implant of claim 11, further comprising a switch matrix section disposed between the electrode section and the at least one detection section, the switch matrix section comprising switching devices for coupling the electrode of each channel to the detection section of the channel or for decoupling it therefrom.

13. The neural implant of claim 12, wherein the switch matrix section comprises switching devices by means of which each electrode can be connected to a ground point.

14. The neural implant of claim 1, wherein the first and/or the second protective structure section is designed to detect a predetermined voltage threshold from a number of different voltage thresholds and to set the signal upon reaching the predetermined voltage threshold.

15. The neural implant of claim 1, further comprising a self-test mechanism, wherein an electrode voltage, based on a predetermined body potential, starting with the body potential is changed and wherein it is then checked whether the signal is set when the respective voltage threshold is reached.

* * * * *